United States Patent [19]

Nakagishi et al.

[11] Patent Number: 5,559,639
[45] Date of Patent: Sep. 24, 1996

[54] BEAM RECEIVING POSITION ADJUSTING DEVICE

[75] Inventors: Toshio Nakagishi; Hitoshi Kimura; Masahiro Oono; Koichi Maruyama; Masato Noguchi, all of Tokyo, Japan

[73] Assignee: Asahi Kogaku Kogyo Kabushiki Kaisha, Tokyo, Japan

[21] Appl. No.: 47,460

[22] Filed: Apr. 19, 1993

[30] Foreign Application Priority Data

Apr. 20, 1992 [JP] Japan ................................. 4-128312
Apr. 23, 1992 [JP] Japan ................................. 4-130026

[51] Int. Cl.$^6$ ................................ G02B 7/02; G11B 7/00
[52] U.S. Cl. .................. 359/823; 359/813; 369/44.14; 369/44.21
[58] Field of Search .................. 359/13, 814, 823, 359/824, 211, 618, 629, 639, 640, 831, 833–837; 359/44.11, 44.14, 44.23, 44.24, 112, 114

[56] References Cited

U.S. PATENT DOCUMENTS

| | | |
|---|---|---|
| 4,841,510 | 6/1989 | Yoshizawa ........................ 369/44.14 |
| 4,850,686 | 7/1989 | Morimoto et al. ..................... 359/837 |
| 5,060,213 | 10/1991 | Kamisada ............................ 369/44.21 |
| 5,151,889 | 9/1992 | Saimi et al. ......................... 369/44.14 |
| 5,162,938 | 11/1992 | Iima et al. ............................. 359/216 |
| 5,247,508 | 9/1993 | Tauaka ................................. 369/44.14 |

FOREIGN PATENT DOCUMENTS

| | | |
|---|---|---|
| 61-175939 | 8/1986 | Japan . |
| 61-206944 | 9/1986 | Japan . |

OTHER PUBLICATIONS

English Language Abstract of Japanese Patent No. 61-206944.

*Primary Examiner*—Thong Nguyen
*Attorney, Agent, or Firm*—Greenblum & Bernstein P.L.C.

[57] ABSTRACT

A device including a polarizing beam splitter by which an incident luminous flux is split into a first luminous flux radiated onto a first photo sensor and a second luminous flux radiated onto a second photo sensor, and an adjusting mechanism provided for adjusting a position of one of the first and second luminous fluxes. The optical axis of the first luminous flux is coincident with that of the incident luminous flux. The optical axis of the second luminous flux is not parallel to the first luminous flux. By moving the beam splitter along the optical axis of the first luminous flux, the beam receiving position of the second photo sensor, onto which the second luminous flux is radiated, is changed.

18 Claims, 11 Drawing Sheets

BEAM RECEIVING POSITION ADJUSTING DEVICE

BACKGROUND OF THE INVENTION

1. Field of the Invention

The present invention relates to a device for adjusting a position of a beam receiving portion of a photo sensor provided in a signal sensing system of a magneto-optical disc device or an optical disc device, for example, a laser beam being radiated onto the beam receiving portion.

2. Description of the Related Art

In an optical disc device, an optical head must be controlled in such a manner that a spot radiated from a laser beam is focused on a recording portion of an optical disc, and is positioned at the center of a track on the optical disc. For this control, a focusing error signal and a tracking error signal are sensed while sensing information recorded on the optical disc. While the focusing error signal is sensed by am astigmatism method, a spot size method has been developed recently to detect the focusing error signal as disclosed in Japanese Unexamined Patent Publication No. 61-206944. The tracking error signal is sensed by a push-pull method.

The focusing error signal and tracking error signal are obtained as follows. Namely, the laser beam reflected from a track of the optical disc is received by a photo sensor which is divided into a plurality of beam receiving areas, and output signals of the divided beam receiving areas are processed and calculated, and thereby the focusing error signal and the tracking error signal are obtained.

In an initial setting (or adjusting) process of the optical disc device, under a condition in which the beam spot radiated onto the optical disc is in-focus and is positioned at a proper position on the track, the position of the optical system must be adjusted in such a manner that the beam reflected by the optical disc, and having the proper size, is radiated onto a proper portion a center portion, usually) of the photo sensor. Since the focusing error signal and the tracking error signal are obtained by detecting changes in form, size and position of the beam spot radiated onto the photo sensor, and the changes are obtained by combining the signals outputted from each of the receiving areas of the photo sensor. Therefore, the initial positions of the sensing system including the photo sensor, a condensor lens and a beam splitter are required to be adjusted with a high degree of accuracy.

Conventionally, in the positional adjustment of the sensing system, the condenser lens is displaced along the optical axis thereof, and the photo sensor is moved in vertical and horizontal directions which are perpendicular to the optical axis. The adjustment in the conventional device is carried out for each sensing operation, i.e., reading of information recorded on the optical disk, sensing of the focusing error signal, and sensing of the tracking error signal. Therefore, the number of portions which should be adjusted are too numerous which makes the adjusting operation cumbersome, and adjusting mechanisms must be provided at too many positions which increases the number of parts of the sensing system.

SUMMARY OF THE INVENTION

Therefore, an object of the present invention is to provide a device by which the positional adjustment of the sensing system is easily carried out by a small number of parts with a high degree of accuracy.

According to the present invention, there is provided a device for adjusting the position of a beam receiving portion of a photo sensor, including a generating mechanism, a receiving mechanism, and a moving mechanism.

The generating mechanism radiates a first luminous flux and a second luminous flux in accordance with a luminous flux entering the generating mechanism. The receiving mechanism receives the first luminous flux and the second luminous flux. The receiving mechanism has a first beam receiving portion onto which the first luminous flux is radiated, and a second beam receiving portion onto which the second luminous flux is radiated. The moving mechanism moves at least one of the generating mechanism and the receiving mechanism in such a manner that the position of one of the first and second beam receiving portions is not changed, and the position of the other of the first and second beam receiving portions is changed.

Further, according to the present invention, there is provided a device for adjusting the position of a beam receiving portion of a photo sensor, including an optical member, a first photo sensor, and a second photo sensor.

The optical member receives at least one luminous flux to generate a first luminous flux and a second luminous flux which are substantially parallel to each other. The first photo sensor has a first beam receiving portion onto which the first luminous flux is radiated. The second photo sensor has a second beam receiving portion onto which the second luminous flux is radiated. At least one of the optical member, the first photo sensor and the second photo sensor are moved along the optical axis of one of the first and second luminous fluxes, whereby the position of one of the first and second beam receiving portions is adjusted.

Furthermore, according to the present invention, there is provided a device for adjusting the position of a beam receiving portion of a photo sensor, including an optical member, a first photo sensor, and a second photo sensor.

The optical member receives at least one luminous flux to generate a first luminous flux and a second luminous flux which are substantially parallel to each other. The first photo sensor has a first beam receiving portion onto which the first luminous flux is radiated. The second photo sensor has a second beam receiving portion onto which the second luminous flux is radiated. At least one of the optical member, the first photo sensor and the second photo sensor are rotated about the optical axis of one of the first and second luminous fluxes, whereby the position of one of the first and second beam receiving portions is adjusted.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
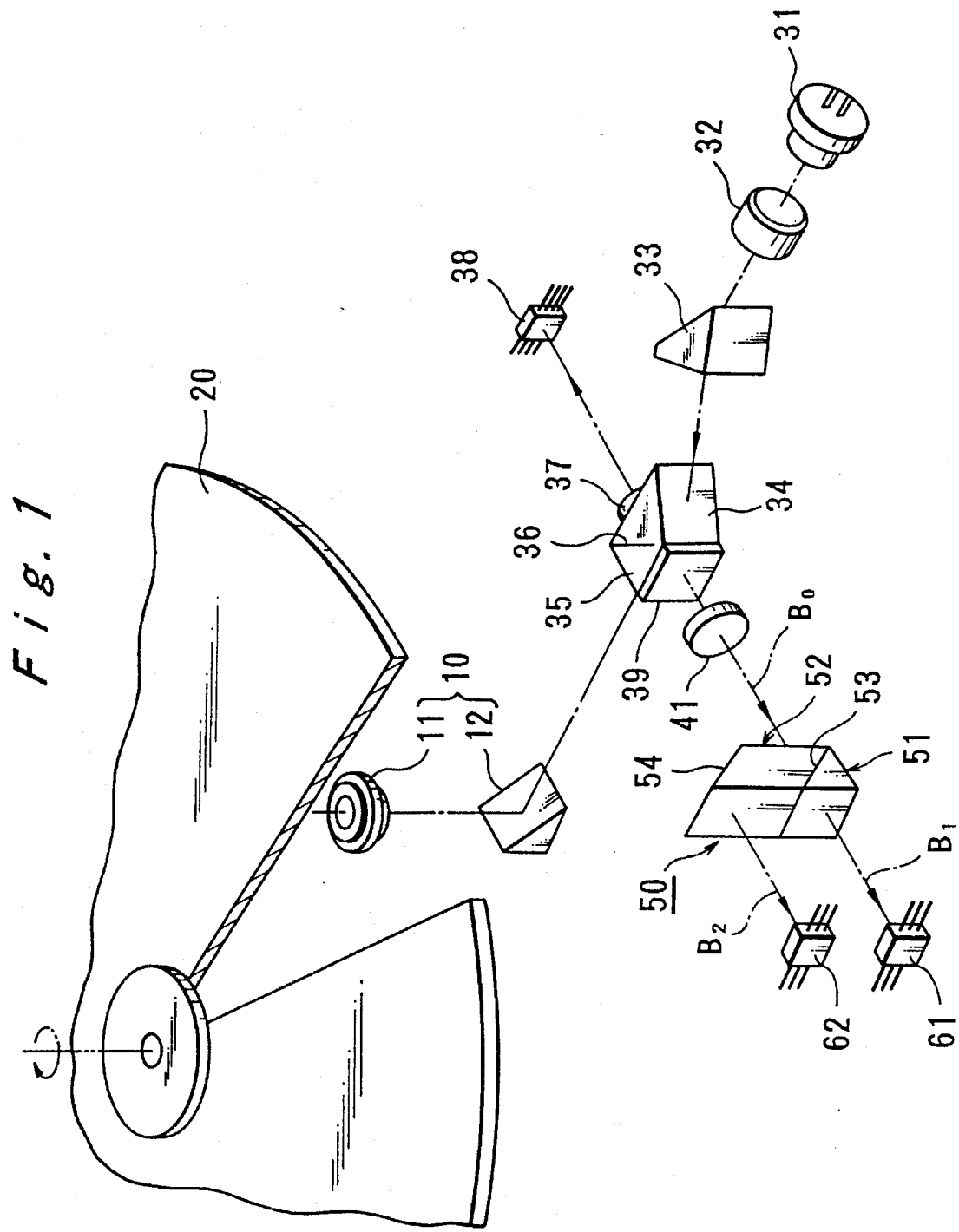
FIG. 1 is a perspective view showing a signal sensing system in which one of a first embodiment through a seventh embodiment of the present invention is provided.

The present invention will now be described with reference to embodiments shown in the drawings.

FIG. 1 shows a signal sensing system which is provided in a magneto-optical disc device, and in which one of a first embodiment through a seventh embodiment of the present invention is included.

In the signal sensing system shown in FIG. 1, an objective optical system 10 having an objective lens 11 and a mirror 12 is provided in an optical head (not shown) and is movable in the radial direction of a magneto-optical disc 20, so that information can be recorded on a track of the magneto-optical disc 20, or information recorded on the track can be reproduced.

A light source has a semiconductor laser 31, and diverging beams generated by the semiconductor laser 31 are changed into a parallel luminous flux by a collimator lens 32. The sectional shape of the luminous flux is formed by two anamorphic prisms 33, 34 such that parallel beams having a circular cross section are outputted, and thus the light intensity distribution is unified.

A right-angle prism 35 is joined to the anamorphic prism 34, and the plane on which the prisms 34 and 35 are joined forms a half-mirror plane (a beam splitting plane) 36. A luminous flux reflected by the half-mirror plane 36 is passed through a condenser lens 37, and is converged onto a photo sensor 38, which is provided for monitoring the output of the semiconductor laser 31. On the other hands a luminous flux passing through the half-mirror plane 36 is reflected by the mirror 12, and thus the direction of the luminous flux is changed by approximately a right angle, so that the luminous flux is converged by the objective lens 11 to be focused on a magnetic layer of the magneto-optical disc 20 on which information is recorded.

The semiconductor laser 31, the collimator lens 32, the anamorphic prisms 33, 34, the right-angle prism 35, the condenser lens 37, and the photo sensor 38 are fixedly mounted on a main frame of the magneto-optical disc device.

Conversely, the objective optical system 10 is mounted on a carriage (not shown) which is movable in a radial direction of the magneto-optical disc 20. The objective lens 11 is disposed on an actuator (not shown) provided in the carriage. The actuator is operated in accordance with the focusing error signal and the tracking error signal, and thus the objective lens 11 is moved in the optical axis direction thereof and in the radial direction of the magneto-optical disc 20 so that a focusing operation and a tracking operation are carried out.

Note, although the objective lens 11 and the mirror 12 are provided on the carriage in this embodiment, other optical members (for example, the collimator lens 32 and the anamorphic prisms 33, 34) and the semiconductor laser 31 may also be provided on the carriage in other embodiments.

The luminous flux reflected by the magnetic layer of the magneto-optical disc 20 is passed through the objective lens 11 and the mirror 12, and is reflected by the half-mirror plane 36 to advance in a direction opposite to the photo sensor 38. Namely, the luminous flux is passed through a λ/2 plate 39 provided on the right-angle prism 35, so that the polarizing direction of the luminous flux is rotated by 45 degrees. Then, the luminous flux is converged by a condenser lens 41 to be changed to a converged luminous flux, and enters a polarizing beam splitter 50.

The polarizing beam splitter 50 includes a first prism 51 having a triangular side face and a second prism 52 having a parallelogrammical side face. The first prism 51 has a polarized light splitting plane 53 on which the first prism 51 is joined with the second prism 52. The luminous flux $B_0$, entering the polarizing beam splitter 50, is separated into an S-polarized-component and a P-polarized-component by passing the flux through the polarized light splitting plane 53. The P-polarized-component is passed through the polarized light splitting plane 53 and the first prism 52 in turn, and is radiated from the first prism 51 as a luminous flux $B_1$, to be received by a first photo sensor 61. The S-polarized-component is reflected by the polarized light splitting plane 53, and is passed through the second prism 52. This S-polarized-component is reflected by a total reflecting plane 54 of the second prism 52, so that the advancing direction of the S-polarized-component is changed, and thus the S-polarized-component is radiated from the second prism 52 as a luminous flux $B_2$, to be received by a second photo sensor 62.

The polarizing direction of the laser beam radiated and reflected by a track of the magneto-optical disc 20 is slightly rotated in accordance with the axis of magnetization of the magnetic layer of the position at which the laser beam is radiated, due to the magnetic Kerr effect. Tn this embodiment, the polarizing direction of the laser beam is rotated by 45 degrees and separated into an S-polarized-component and a P-polarized-component by the polarized light splitting plane 53. Then, the intensities of the S-polarized-component and the P-polarized-component are sensed by the separate photo sensors 61 and 62, and thus the difference between the intensities is obtained by calculation, so that a recorded signal having a high S/N ratio can be read.

Note, as described later, the photo sensors 61 and 62 are divided into a plurality of beam receiving areas by lines extending in a predetermined direction, so that a signal is obtained at each of the divided beam receiving areas, respectively.

Figure 2:
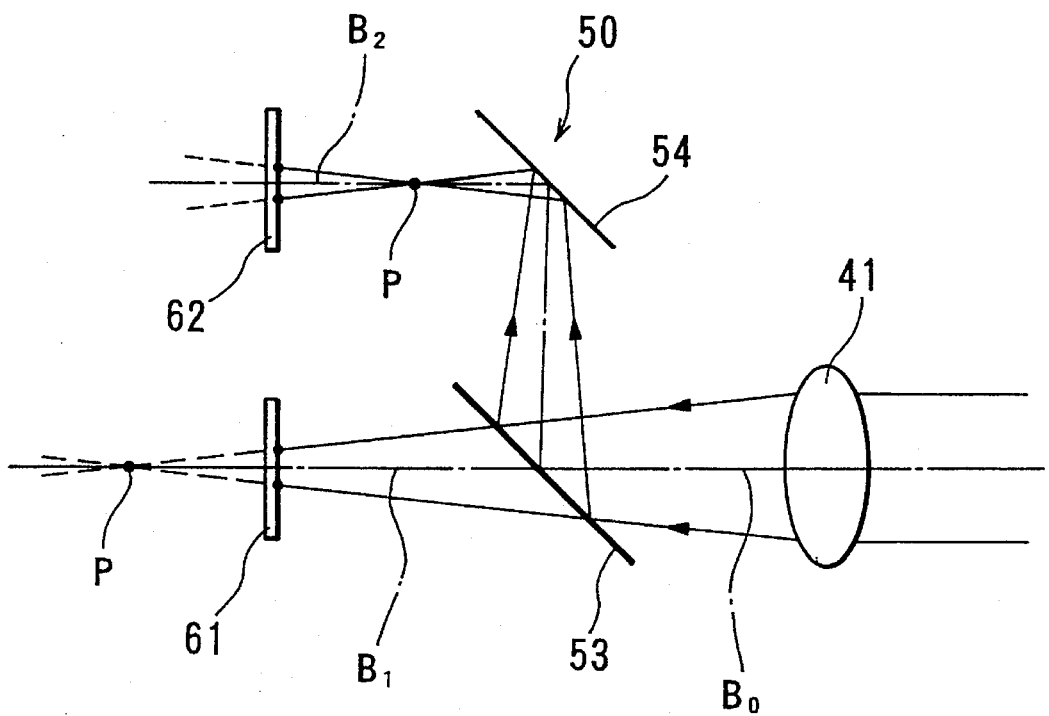
FIG. 2 is a view schematically showing a relationship between a photo sensor and a luminous flux.

Further note, as shown in FIG. 2, the first photo sensor 61 and the second photo sensor 62 are disposed in front of a point P or behind the point P, respectively. The distance between the first photo sensor 61 and the point P is equal to the distance between the second photo sensor 62 and the point P, wherein the point P is the focusing point in a state in which the objective lens 11 is set to be in-focus at the magnetic layer of the magneto-optical disc 20.

Since the focusing point P is moved in the optical axis direction in accordance with the state in which the objective lens 11 is focused on the magneto-optical disc 20, sizes of radiated beam spots S1 and S2 (see FIG. 8) formed on the photo sensors 61 and 62, are changed. The changes are calculated by the following equation (1) based on output signals of the beam receiving areas X1, Y1, Z1 of the photo sensor 61 and the beam receiving areas X2, Y2, Z2 of the photo sensor 62, so that a focusing error signal FE is obtained. This is referred to as the Spot Size Method in this specification. Note, in the equation, output signals of the beam receiving areas are shown by the same references as used to indicate the beam receiving areas.

$$FE=(X1+Z1+Y2)-(Y1+X2+Z2) \quad (1)$$

Figure 8:
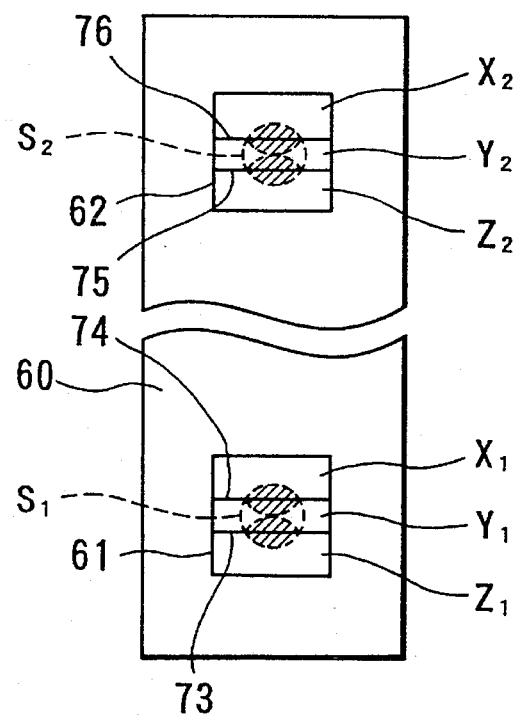
FIG. 8 is a view showing photo sensors.

If the beam spot radiated onto a track of the magneto-optical disc 20 deviates from the track, interference areas (formed in a symmetrical shape with respect to the center of the spot, as shown in FIG. 8) of a zero-order diffracting beam and a first-order diffracting beam in the beam spots S1 and S2 radiated onto the photo sensors 61 and 62, are moved due to the effect of grooves formed on both sides of the track, and thus, the beam intensity distribution on each of the beam receiving areas of the photo sensors 61 and 62 is changed. This change is calculated by the following equation (2) based on output signals of the beam receiving areas X1, Y1, Z1 of the photo sensor 61 and the beam receiving areas X2, Y2, Z2 of the photo sensor 62, so that a tracking error signal TE is obtained (Push-Pull Method).

$$TE=(X1+Z2)-(Z1+X2) \quad (2)$$

Note, sensing operations of the focusing error and the tracking error are not restricted to those described above. Namely, for example, to detect a focusing error, for example, the astigmatism method may be used instead of the Spot Size Method.

Constructions of beam receiving position adjusting devices are described below with reference to FIGS. 3 through 10.

Figure 3:
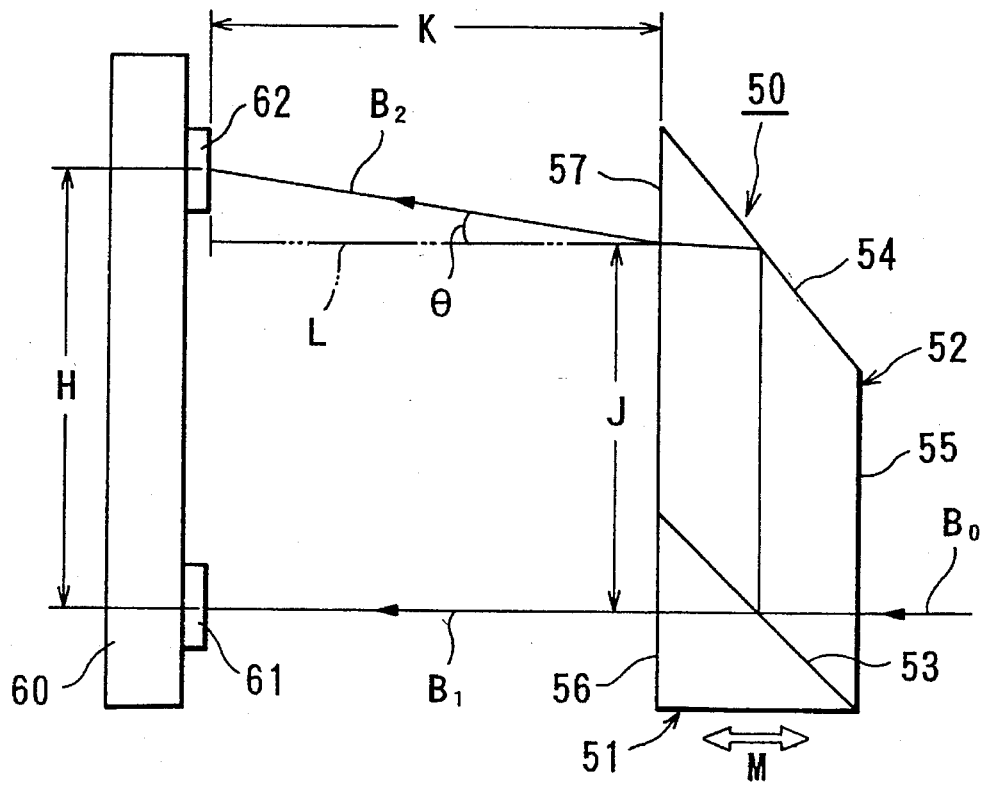
FIG. 3 is a view schematically showing a first embodiment of the present invention.

FIG. 3 shows a first embodiment of the beam receiving position adjusting device. In this embodiment, the beam splitter 50 has an incident plane 55, a first radiating (emergent) plane 56, and a second radiating (emergent) plane 57. The incident plane 55 and the second radiating plane 57 are formed on the second prism 52, and the first radiating plane 56 is formed on the first prism 51. The first and second radiating planes 56 and 57 are parallel to the incident plane 55. The polarized light splitting plane 53 is inclined by about 45 degrees with respect to the incident plane 55, and the total reflecting plane 54 is not parallel to the polarized light splitting plane 53.

The luminous flux $B_0$ enters the first prism 52 through the incident plane 55 at a right angle relative to the incident plane 55. The incident luminous flux $B_0$ is split into two luminous fluxes by the polarized light splitting plane 53. The luminous flux passing through the polarized light splitting plane 53 is radiated from the first radiating plane 56 as the first luminous flux $B_1$. The luminous flux reflected by the polarized light splitting plane 53 is reflected by the total reflecting plane 54, and is radiated from the second radiating plane 57 as the second luminous flux $B_2$.

Therefore, the optical axis of the luminous flux $B_0$ is the same as that of the first luminous flux $B_1$, and the optical axis of the second luminous flux $B_2$ is not parallel to the optical axis of the first luminous flux $B_1$. Namely, the optical axis of the second luminous flux $B_2$ is inclined by an angle θ relative to a line L which is parallel to the optical axis of the first luminous flux $B_1$.

Figure 4:
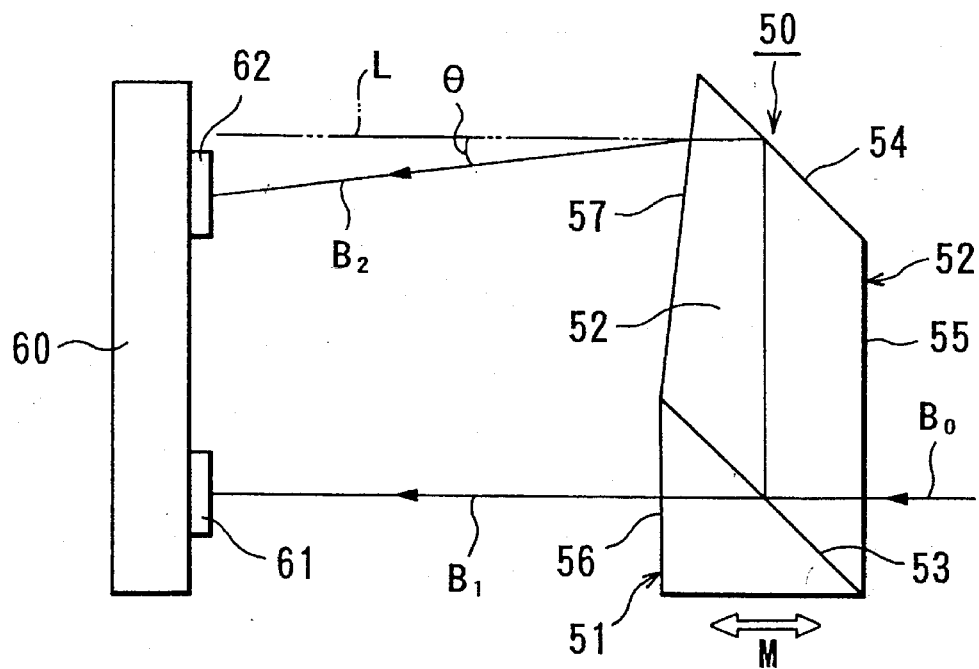
FIG. 4 is a view schematically showing a second embodiment of the present invention.

FIG. 4 shows a second embodiment of the beam receiving position adjusting device. In this embodiment, the polarized light splitting plane 53 is inclined by about 45 degrees with respect to the incident plane 552 and the total reflecting plane 54 is parallel to the polarized light splitting plane 53. The second radiating plane 57 of the second prism 52 is not parallel to the incident plane 55.

Therefore, the optical axis of the luminous flux $B_0$ entering the incident plane 55 at a right angle is the same as that of the first luminous $B_1$. The optical axis of the second luminous flux $B_2$ is not parallel to the optical axis of the first luminous flux $B_1$ since the second luminous flux $B_2$ is bent at the second radiating plane 57. Namely, the optical axis of the second luminous flux $B_2$ is inclined by an angle Θ relative to a line L which is parallel to the optical axis of the first luminous flux $B_1$.

Figure 5:
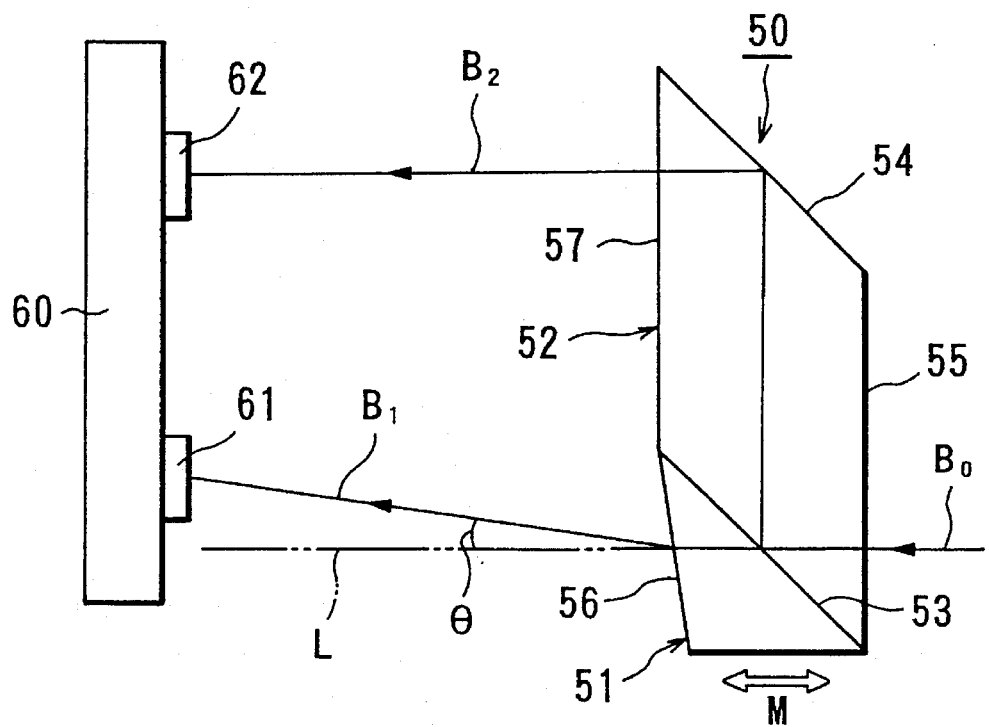
FIG. 5 is a view schematically showing a third embodiment of the present invention.

FIG. 5 shows a third embodiment of the beam receiving position adjusting device. In this embodiments the polarized light splitting plane 53 is inclined by about 45 degrees with respect to the incident plane 55, the total reflecting plane 54 is parallel to the polarized light splitting plane 53. The incident plane 55 is parallel to the second radiating plane 57. The first radiating plane 56 of the first prism 51 is not parallel to the incident plane 55.

Therefore, the optical axis of the luminous flux $B_0$, entering the incident plane 55 at a right angle is parallel to that of the second luminous flux $B_2$. The optical axis of the first luminous flux $B_1$ is not parallel to the optical axis of the second luminous flux $B_2$, since the first luminous flux $B_1$ is bent at the first radiating plane 56. Namely, the optical axis of the first luminous flux $B_1$ is inclined by an angle θ relative to a line L which is parallel to the optical axis of the second luminous flux $B_2$.

Figure 6:
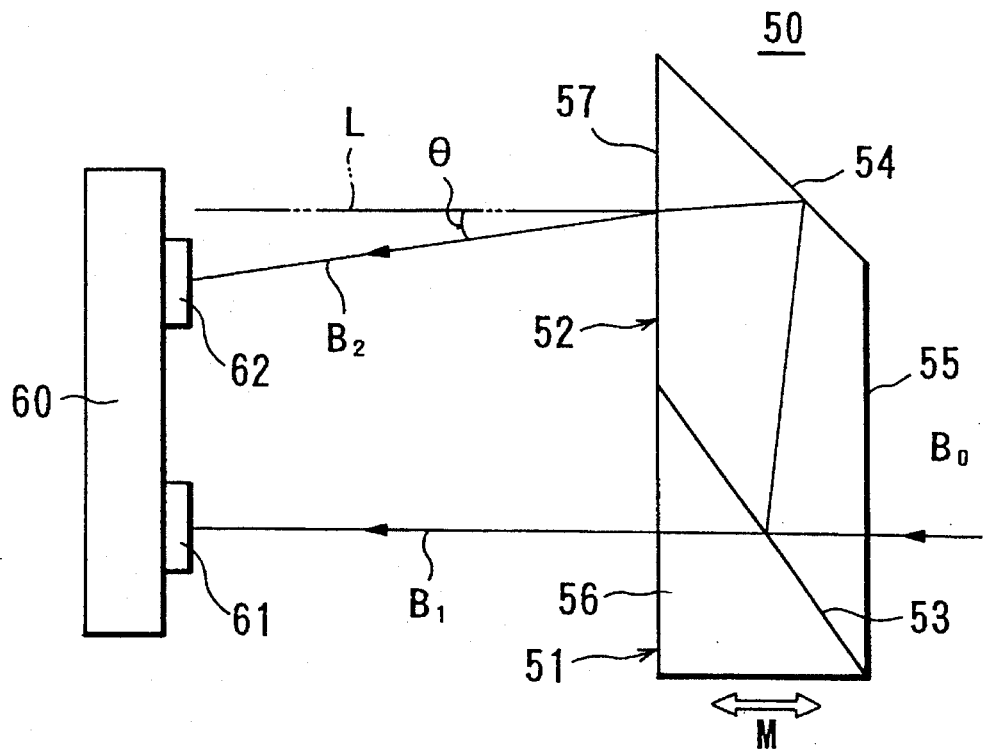
FIG. 6 is a view schematically showing a fourth embodiment of the present invention.

FIG. 6 shows a fourth embodiment of the beam receiving position adjusting device. In this embodiment, the polarized light splitting plane 53 is inclined by an angle smaller than 45 degrees with respect to the incident plane 55 and the total reflecting plane 54 is not parallel to the polarized light splitting plane 53. The first radiating plane 56 and the second radiating plane 57 are parallel to the incident plane 55. The polarized light splitting plane 53 may be inclined by an angle larger than 45 degrees with respect to the incident plane 55.

Therefore, the optical axis of the luminous flux $B_0$, entering the incident plane 55 at a right angle, is coincident with that of the first luminous flux $B_1$. The optical axis of the second luminous flux $B_2$ is not parallel to the optical axis of the first luminous flux $B_1$, since the second luminous flux $B_2$ is reflected by the polarized light splitting plane 53 and the total reflecting plane 54 at an angle smaller than a right angle. Namely, the optical axis of the second luminous flux $B_2$ is inclined by an angle θ relative to a line L which is parallel to the optical axis of the first luminous flux $B_1$.

Figure 7:
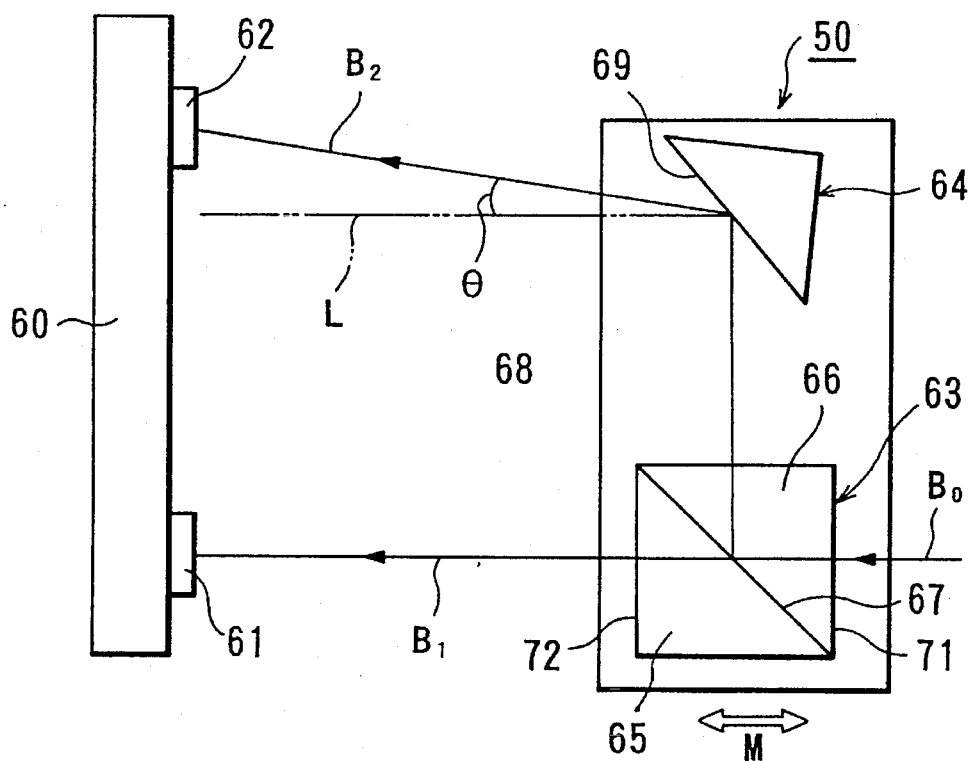
FIG. 7 is a view schematically showing a fifth embodiment of the present invention.

FIG. 7 shows a fifth embodiment of the beam receiving position adjusting device. In this embodiment, the beam splitter 50 has a beam splitting unit 63 and a mirror 64. The beam splitting unit 63 includes two right-angle prisms 65 and 66 each having an equilateral-right-angled triangular side face. The right-angle prisms 65 and 66 are joined with each other on a polarized light splitting plane 67. The beam splitting unit 63 and the mirror 64 are mounted on a support plate 68 in such a manner that the polarized light splitting plane 67 and a total reflecting plane 69 of the mirror 64 are not parallel to each other.

A luminous flux $B_0$ enters the prism 66 through an incident plane 71 with a right angle relative to the incident plane 71. The incident luminous flux $B_0$ is split into two luminous fluxes by the polarized light splitting plane 67. The luminous flux passing through the polarized light splitting plane 67 is radiated from a first radiating plane 72 as a first luminous flux $B_1$. The luminous flux reflected by the polarized light splitting plane 67 is reflected by the total reflecting plane 69, and is radiated from the prism 69 as a second luminous flux $B_2$.

According to this construction, the optical axis of the luminous flux $B_0$, entering the incident plane 71 of the prism 66 at a right angle, is coincident with that of the first luminous flux $B_1$. The optical axis of the second luminous flux $B_2$ is not parallel to the optical axis of the first luminous flux $B_1$. Namely, the optical axis of the second luminous flux $B_2$ is inclined by an angle θ relative to a line L which is parallel to the optical axis of the first luminous flux $B_1$.

In the beam receiving position adjusting devices shown in FIGS. 3 through 7, the photo sensors 61 and 62 are mounted on a single plane of a support frame 60 or two planes of the support frame 60 which are parallel to each other. The surfaces of the beam receiving areas of the photo sensors 61 and 62 are perpendicular to the line L. The distance H, between the positions where the photo sensors 61 and 62 are mounted, i.e., the distance from the center of the photo sensor 61 to the center of the photo sensor 62, is indicated by the following equation (3);

$$H = J \pm K\Theta \qquad (3)$$

wherein J represents the distance from the optical axis of the radiating luminous flux $B_1$ (the radiating luminous flux $B_2$ in the device shown in FIG. 5) to the line L, and K represents the distance from the radiating plane 57 to the plane of the surfaces of the beam receiving areas of the photo sensors 61 and 62, H, J and K shown in FIG. 3.

In the equation (3), the sign is "−" when the luminous fluxes $B_1$ and $B_2$ are radiated in such a manner that they converge with each others and the sign is "+" when the luminous fluxes $B_1$ and $B_2$ are radiated in such a manner that they diverge away from each other.

Accordingly, for the beam receiving position adjusting devices shown in FIGS. 3 and 7, H=J+KΘ, and for the beam receiving position adjusting devices shown in FIGS. 4 through 6, H=J−KΘ.

In the beam receiving position adjusting devices of the embodiments, since an adjusting operation is carried out as described below, it is not necessary for the distance between the photo sensors 61 and 62 to be adjusted with a high degree of accuracy when the photo sensors 61 and 62 are mounted on the support frame 60. Therefore, the operation of mounting the photo sensors 61 and 62 on the support frame 60 is easy.

Note, the angle θ, formed by the line L and the luminous flux $B_1$ or $B_2$, is determined by taking into account the sensitivity of the photo sensors 61 and 62 to variations in the distance of the radiated beam spots S1 and S2. Usually, the angle θ is relatively small, and is preferably from 1 degree to 10 degrees, for example.

As shown in FIG. 8, the photo sensor 61 is divided into three beam receiving areas X1, Y1 and Z1 by boundary lines 73 and 74. The photo sensor 62 is divided into three beam receiving areas X2, Y2 and Z2 by boundary lines 75 and 76. In the signal sensing system, shown in FIG. 1, the direction in which the boundary lines 73 through 76 extend optically coincides with the direction of a track (a circumferential direction) of the magneto-optical disc 20. The positions of the photo sensors 61 and 62, onto which the beam spots S1 and S2 are radiated, are adjusted by the beam receiving position adjusting device along the direction perpendicular to the boundary lines 73 through 76, and this direction coincides with a direction vertical to the line L in FIGS. 3 through 7. The positions of the photo sensors 61 and 62, onto which the beam spots S1 and S2 are radiated, are adjusted such that the beam spots S1 and S2 are formed on the photo sensors 61 and 62 at the same positions and in the same manner with respect to the boundary lines 73 through 76, in a state in which the center of the beam spot radiated on the magneto-optical disc 20 is located at the center of the track, i.e., a state in which the beam spot is correctly positioned at the track.

Thus, the photo sensors 61 and 62 are disposed in such a manner that the boundary lines 73 through 76 extend in a direction which is perpendicular to the line along which positions of the radiated spots S1 and S2 are changed by the beam receiving position adjusting device.

Notes the divided pattern of the beam receiving areas of the photo sensors 61 and 62 is not restricted to that shown in FIG. 8, and can be changed accordingly to sense the focusing error signal, the tracking error signal and so on.

In the beam receiving position adjusting devices, the adjusting operation of the beam receiving positions of the photo sensors 61 and 62 is carried out in such a manner that the polarizing beam splitter 50 and the photo sensors 61 and 62 are moved relative to each other, along the optical axis of one of the first luminous flux $B_1$ and the second luminous flux $B_2$. In the devices, shown in FIGS. 3 through 7, the photo sensors 61 and 62 are fixed on a main frame of the magneto-optical disc device, the polarizing beam splitter 50 is moved along a line (the optical axis direction of the incident luminous flux $B_0$) which is perpendicular to the beam receiving face of the photo sensors 61 and 62.

When the polarizing beam splitter 50 is moved in the direction shown by an arrow M, although the position on which the beam spot is radiated is not changed in the photo sensor 61 or 62, on which the luminous flux parallel to the moving direction is radiated, the position on which the beam spot is radiated is changed in the other photo sensor 62 or 61.

In the beam receiving position adjusting devices, shown in FIGS. 3, 4, 6 and 7, when the polarizing beam spliter 50 is moved along the direction indicated by the arrow M, the position of the beam spot S1 is not changed on the beam receiving face of the photo sensor 61 onto which the luminous flux $B_1$ is radiated. Conversely, on the beam receiving face of the other photo sensor 62, onto which the luminous flux $B_2$ is radiated, the position of the beam spot S2 is moved in the direction perpendicular to the boundary lines 75 and 76 at a predetermined ratio, in accordance with the movement of the polarizing beam splitter 50. On the other hand, in the beam receiving position adjusting device, shown in FIG. 5, the operation is reversed from the above described operation.

Accordingly, for the beam receiving position adjusting devices, shown in FIGS. 3, 4, 6 and 7, first, the support frame 60 is positioned at a predetermined position so that the photo sensor 61, on which the beam spot S1 is not moved, is set to a proper position, namely, so that the center of the beam spot S1 coincides with the center of the beam receiving face of the photo sensor 61. Note, the support frame 60 is provided on a mechanism such as that shown in FIG. 11, for example, to be movable in a direction perpendicular to the direction shown by the arrow M, so that the center of the beam spot S1 coincides with the center of the beam receiving area of the photo sensor 61. After this adjustment, the polarizing beam splitter 50 is moved in the direction of the arrow M so that the center of the beam spot S2 coincides with the center of the beam receiving face of the photo sensor 62. Thus, the luminous fluxes $B_1$ and $B_2$ are adjusted to be radiated onto proper portions on the photo sensors 61 and 62. On the other hand, for the beam receiving position adjusting device, shown in FIG. 5, the positional adjustment is first carried out for the photo sensor 62, and is then carried out for the photo sensor 61.

Figure 9:
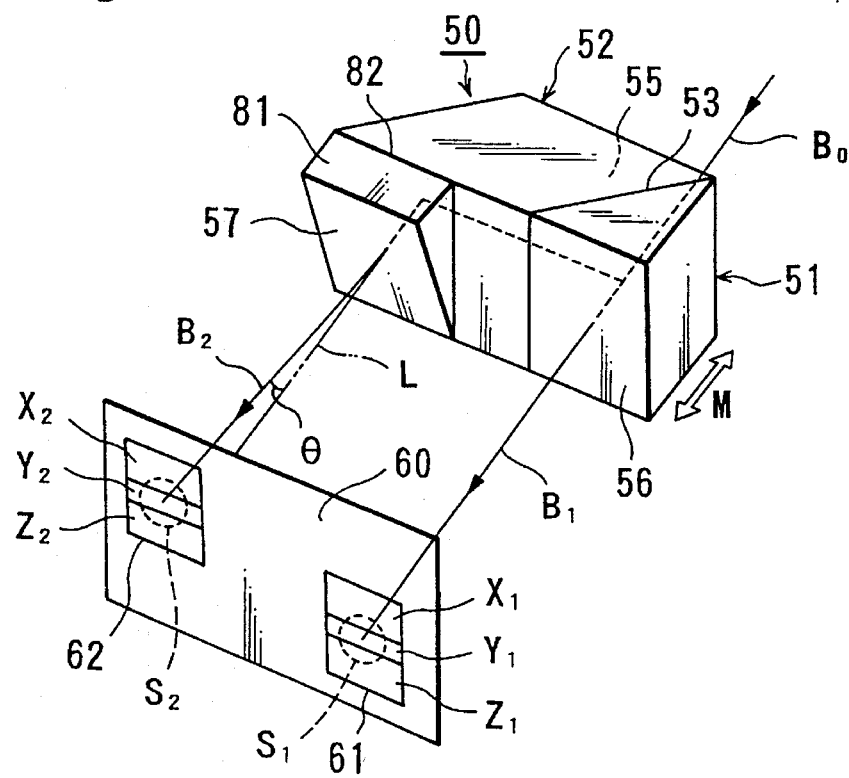
FIG. 9 is a perspective view showing a sixth embodiment of the present invention.

FIG. 9 shows a sixth embodiment of the beam receiving position adjusting device. In this embodiment, the polarizing beam splitter 50 includes a first prism 51 having an equilateral-right-angled triangular plane face, a second prism 52 having a, parallelogrammical plane face, and a third prism 81 having a wedge-shape. The first prism 51 has a polarized light splitting plane 53 on which the first prism 51 is joined with the second prism 52. A side face 82 of the third prism 81 is joined to a side face of the second prism 52. An incident plane 55 is a surface opposite to a surface on which the third prism 81 is joined. A first radiating plane 56 is formed on the first prism 51. A second radiating plane 57 is formed on the third prism 81.

The optical axis of the luminous flux $B_0$, entering the incident plane 55 at a right angle thereto, coincides with the optical axis of the luminous flux $B_1$ radiated from the first radiating plane 56. The luminous flux $B_2$, radiated from the second radiating plane 57, is bent at the second radiating plane 57. Therefore, the optical axis of the luminous flux $B_2$ is not parallel to the optical axis of the luminous flux $B_1$, but is inclined by a angle θ, to the line L parallel to the luminous flux $B_1$, in a direction perpendicular to the boundary lines 75 and 76 of the beam receiving areas X2, Y2 and Z2 of the photo sensor 62.

Figure 10:
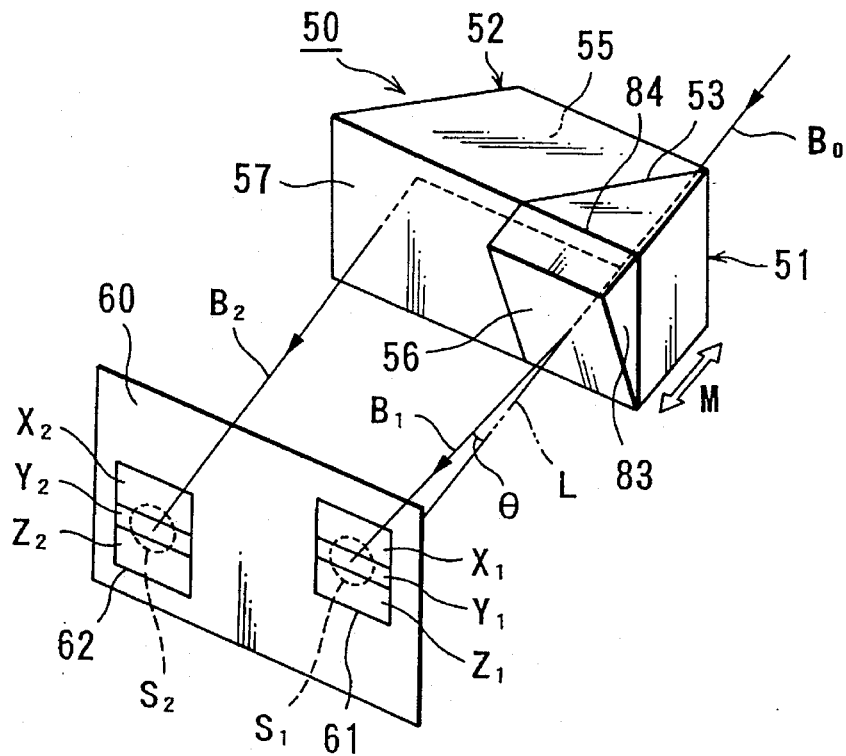
FIG. 10 is a perspective view showing a seventh embodiment of the present invention.

FIG. 10 shows a seventh embodiment of the beam receiving position adjusting device. In this embodiment, the polarizing beam splitter 50 includes a first prism 51 and a second prism 52 which have the same construction as the sixth embodiment shown in FIG. 9. A third prism 83, having a wedge-shape, is joined with the first prism 51 through a side face 84 of the third prism 83. A first radiating plane 56 is formed on the third prism 83. A second radiating plane 57 is formed on the second prism 52.

The optical axis of the luminous flux $B_0$, entering the incident plane 55 at a right angle thereto, is parallel to the optical axis of the luminous flux $B_2$ radiated from the second radiating plane 57. The luminous flux $B_1$, radiated from the first radiating plane 56, is bent at the first radiating plane 56. Thus the optical axis of the luminous flux $B_1$ is not parallel to the optical axis of the luminous flux $B_2$, but is inclined by an angle θ, to the line L parallel to the luminous flux $B_1$, in a direction perpendicular to the boundary lines 73 and 74 of the beam receiving areas X1, Y1 and Z1 of the photo sensor 61.

Note, the wedge-shaped third prisms 81 and 83 can be formed the first prism 51 or the second prism 52 as one body.

In these beam receiving position adjusting devices, shown in FIGS. 9 and 10, the photo sensors 61 and 62 are mounted on a single plane of a support frame 60, or two planes of the support frame 60 which are parallel to each other, in such a manner that the beam receiving faces of the photo sensors 61 and 62 are perpendicular to the line L.

The photo sensors 61 and 62 are divided into the beam receiving areas X1, Y1, Z1 and the beam receiving areas X2, Y2, Z2, respectively, similarly to the construction shown in FIG. 8. The direction of each of the boundary lines optically coincides with the direction of a track (a circumferential direction) of the magneto-optical disc 20. The positions of the photo sensors 61 and 62 onto which the beam spots S1 and S2 are radiated, are adjusted by the beam receiving position adjusting device along the direction perpendicular to the boundary lines 73 through 76. The direction is perpendicular to both the longitudinal direction of the support frame 60 and the luminous flux $B_0$.

Note, the pattern into which the photo sensors 61 and 62 are divided is not restricted to that shown in the drawings, as described with reference to FIG. 8.

In the beam receiving position adjusting devices, shown in FIGS. 9 and 10, the adjusting operation of the beam receiving position on the photo sensors 61 and 62 is carried out as follows. First, the photo sensors 61 and 62 are fixed on a main frame of the magneto-optical disc device, and then, the polarizing beam splitter 50 is moved in the direction perpendicular to the beam receiving faces of the photo sensors 61 and 62. When the polarizing beam splitter 50 is moved in the direction of the arrow M, although the position onto which the beam spot is radiated is not changed in the photo sensor 61 or 62 onto which the luminous flux parallel to the moving direction is radiated, the position onto which the beam spot is radiated is changed in the other photo sensor 62 or 61.

In the beam receiving position adjusting device, shown in FIG. 9, even when the polarizing beam splitter 50 is moved along the direction of the arrow M, the position of the beam spot S1 is not changed on the beam receiving face of the photo sensor 61 onto which the luminous flux $B_1$ is radiated. Conversely, on the beam receiving face of the other photo sensor 62, onto which the luminous flux $B_2$ is radiated, the position of the beam spot S2 is moved in the direction perpendicular to the boundary lines of each of the beam receiving areas of the photo sensor 62, in accordance with the movement of the polarizing beam splitter 50. The direction is perpendicular to both the longitudinal direction of the support frame 60 and to the luminous flux $B_0$. On the other hands in the beam receiving position adjusting device, shown in FIG. 10, the operation is the reverse of the above described operation.

Accordingly, in the beam receiving position adjusting device, shown in FIG. 9, first, the support frame 60 is positioned at a predetermined position in such a manner that the photo sensor 61, on which the beam spot S1 is not moved, is set to a proper position, namely, in such a manner that the center of the beam spot S1 coincides with the center of the beam receiving face of the photo sensor 61. Then, the polarizing beam splitter 50 is moved in the direction of the arrow M by a predetermined amount so that the center of the beam spot S2 coincides with the center of the beam receiving face of the photo sensor 62. Thus, the luminous fluxes $B_1$ and $B_2$ are adjusted to be radiated onto proper portions on the photo sensors 61 and 62. On the other hand, for the beam receiving position adjusting device, shown in FIG. 10, the positional adjustment is carried out for the photo sensor 62 and is then carried out for the photo sensor 61.

Note, sensitivity to the amount of movement of the beam spot S1 or S2, relative to the amount of movement of the polarizing beam splitter 50 in the direction of the arrow M, depends upon the inclination angle θ. For example, when the amount of movement ΔK of the polarizing beam splitter 50 is 1 mm, the sensitivity of the amount of movement ΔS of the beam spot S1 or S2 is shown in the following table;

| Inclination Angle $\theta$ | Amount of Movement of Beam Spot $\Delta S$ |
|---|---|
| 1° | 0.017 mm |
| 2° | 0.035 mm |
| 3° | 0.052 mm |
| 5° | 0.087 mm |
| 10° | 0.175 mm | where in $\Delta K=1$ mm.

As understood from the above table, by setting the inclination angle $\theta$ to a proper values the amount of movement $\Delta S$ of the beam spot on the photo sensor relative to the amount of movement $\Delta K$ of the polarizing beam splitter 50 is set to a proper value. Further, the amount of movement $\Delta S$ is very small when $\Delta K=1$ mm. Therefore, the position of the beam spot on the photo sensor can be easily adjusted with a high degree of accuracy.

As described above, in the beam receiving position adjusting devices, shown in FIGS. 3 through 7, 9 and 10, the beam receiving positions of the photo sensors 61 and 62 are adjusted by only an operation in which the polarizing beam splitter 50 is moved in one direction. Namely, this operation is very easy, and the positional adjustment can be attained with a high degree of accuracy.

Figure 11:
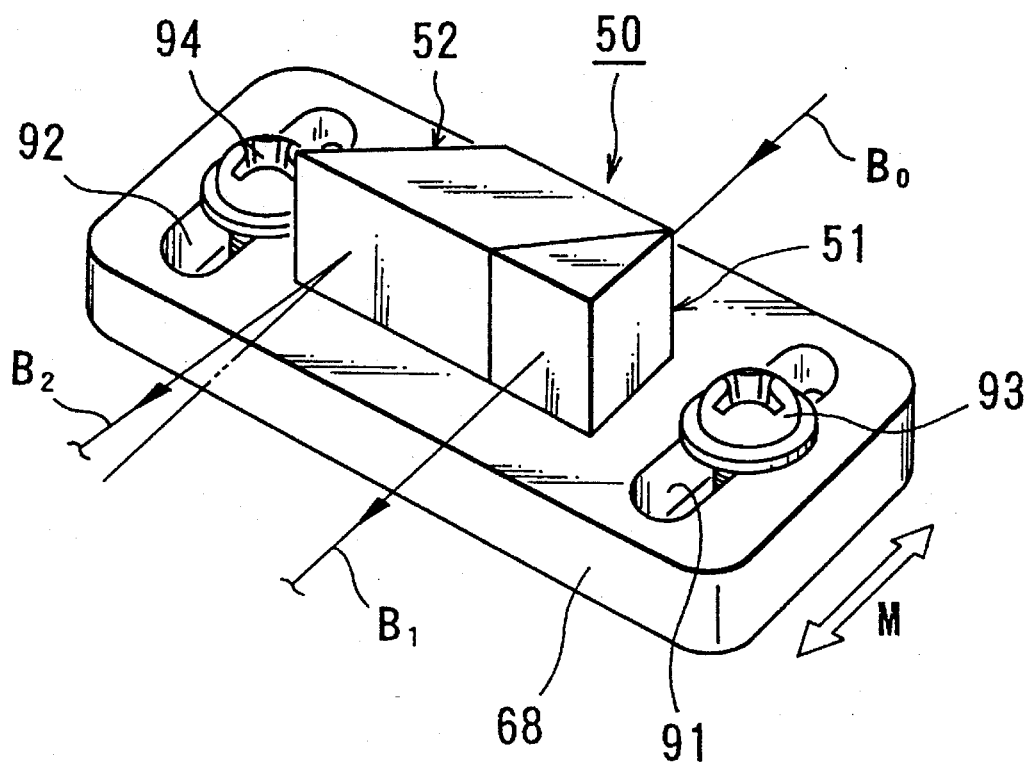
FIG. 11 is a perspective view showing a mechanism by which a polarizing beam splitter is moved.

FIG. 11 shows a mechanism by which the polarizing beam splitter 50 is moved along the direction of the arrow M. Tn this mechanisms, the polarizing beam splitter 50 is mounted on a support plate 68 which is supported by a main frame of the magneto-optical disc device to be movable along the direction of the arrow M. The support plate 68 is provided with slots 91 and 92 at opposite ends thereof, and these slots 91 and 92 are extended in the moving direction shown by the arrow M. Screws 93 and 94 are disposed in the slots 91 and 92, to fix the support plate 68 to a predetermined position.

In a positional adjusting operation of the polarizing beam splitter 50, the support plate 68 is moved along the direction of the arrow M by loosening the screws 93 and 94, and is adjusted to a predetermined position. Then, the tip portions of the screws 93 and 94 are threadingly fitted into the main frame, and are tightened so that the support plate 68 is secured to the main frame.

In another construction in which the support plate 68 is smoothly moved in the direction of the arrow M, a guide member or a guide groove may be provided on the support plate 68 and/or the main frame. Since the amount of movement $\Delta S$ of the beam spot is very small, while the amount of movement $\Delta K$ of the polarizing beam splitter 50 is relatively large, the construction does not require a precise and complex mechanism.

Note, the relationship between the incident luminous flux $B_0$ and the radiation luminous flux $B_1$, $B_2$ is not restricted to those shown in the drawings. Namely, the disposition of the optical components, shown in FIGS. 3 through 7, can be such that the incident luminous flux $B_0$ can enter the polarizing beam splitter 50 along a line perpendicular to the luminous flux $B_1$ (he line L in case of FIG. 5), i.e., advancing from the bottom of each of the drawings. The luminous flux $B_0$ is reflected by the polarized light splitting plane 53 to become the radiating luminous flux $B_1$, and is passed through the polarized light splitting plane 53 to become the radiating luminous flux $B_2$. In this construction, the polarizing beam splitter 50 is moved in a direction (the direction of the arrow M) perpendicular to the optical axis of the incident luminous flux $B_0$.

Note, although the beam splitter 50, splitting the single incident luminous flux $B_0$ into the two radiating luminous fluxes $B_1$ and $B_2$, is provided in the above embodiments, a beam splitter, which derives two radiating luminous fluxes from two incident luminous fluxes, may be provided.

Further note, although the polarizing beam splitter 50 is moved to adjust the position of the beam spot S1 or S2 in the above embodiments, the present invention is not rectricted to this construction. Namely, the photo sensors 61 and 62 may be moved in a direction of the optical axis of one of the radiating luminous fluxes, or one of the photo sensors 61 and 62 may be moved in that direction. In the case in which the photo sensors 61 and 62 are moved when sensing the focusing error signal by the Spot Size Method, the photo sensors 61, 62, and the condenser lens 41 are moved as one body.

In the above embodiments, the luminous flux $B_1$ or $B_2$ is moved along a straight line. Conversely, in embodiments described below, the luminous flux $B_1$ or $B_2$ is rotated about the optical axis of the luminous flux $B_1$ to adjust the beam receiving position.

Figure 12:
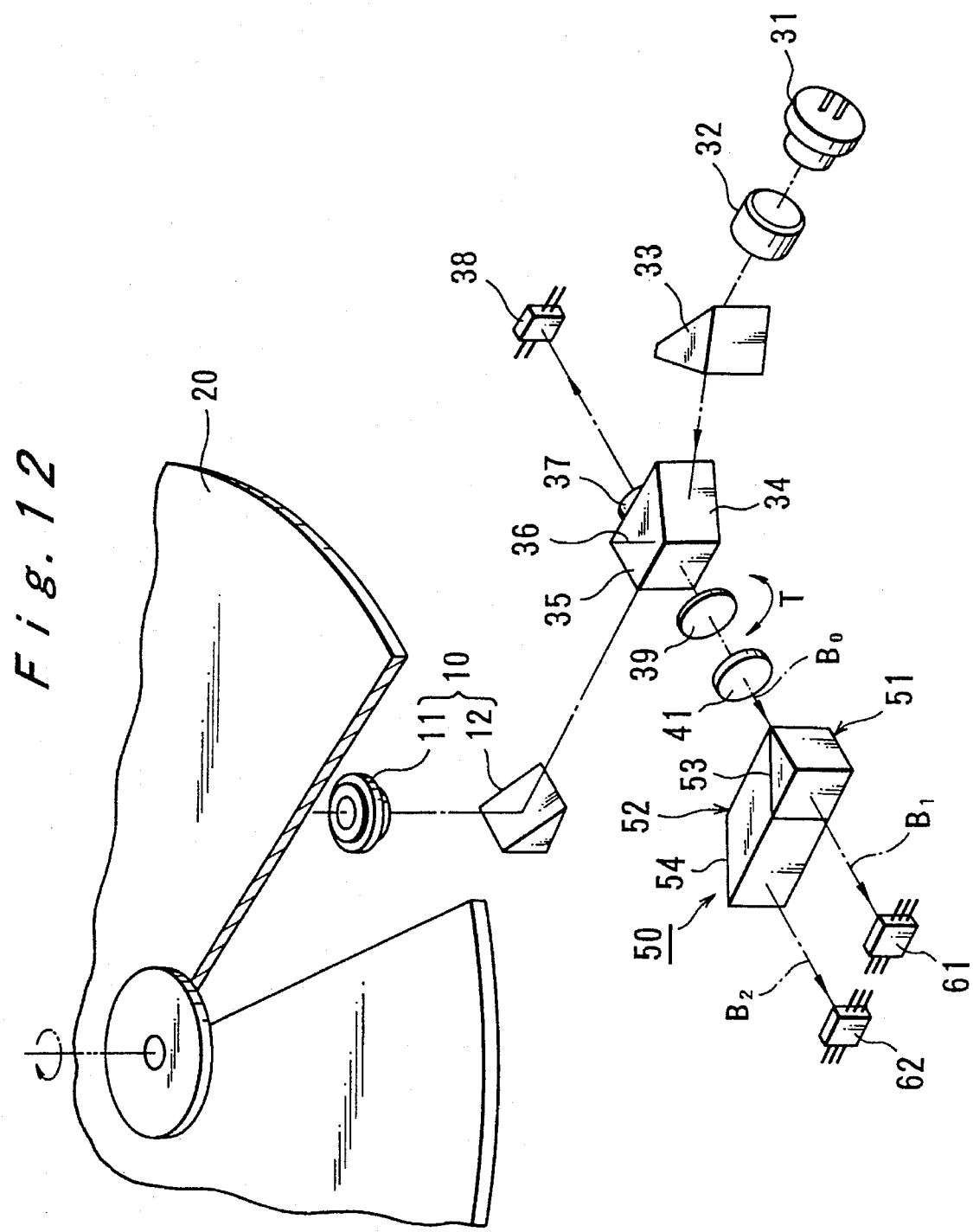
FIG. 12 is a perspective view showing a signal sensing system in which one of an eighth embodiment through a tenth embodiment of the present invention is provided.

FIG. 12 shows a signal sensing system which is provided in a magneto-optical disc device, and in which one of an eighth embodiment through a tenth embodiment of the present invention is included. Most elements included in the signal sensing system are common to the system, shown in FIG. 1, and therefore, only constructions different from the system shown in FIG. 1 are described below.

Namely, the $\lambda/2$ plate 39 and the condenser lens 41 are aligned on the optical axis thereof. The $\lambda/2$ plate 39 can be rotated about the optical axis in the clockwise direction or the counterclockwise direction by a predetermined angle. A rotating mechanism by which the $\lambda/2$ plate 39 is rotated is similar to one shown in FIGS. 13, 15 and 17.

Figure 13:
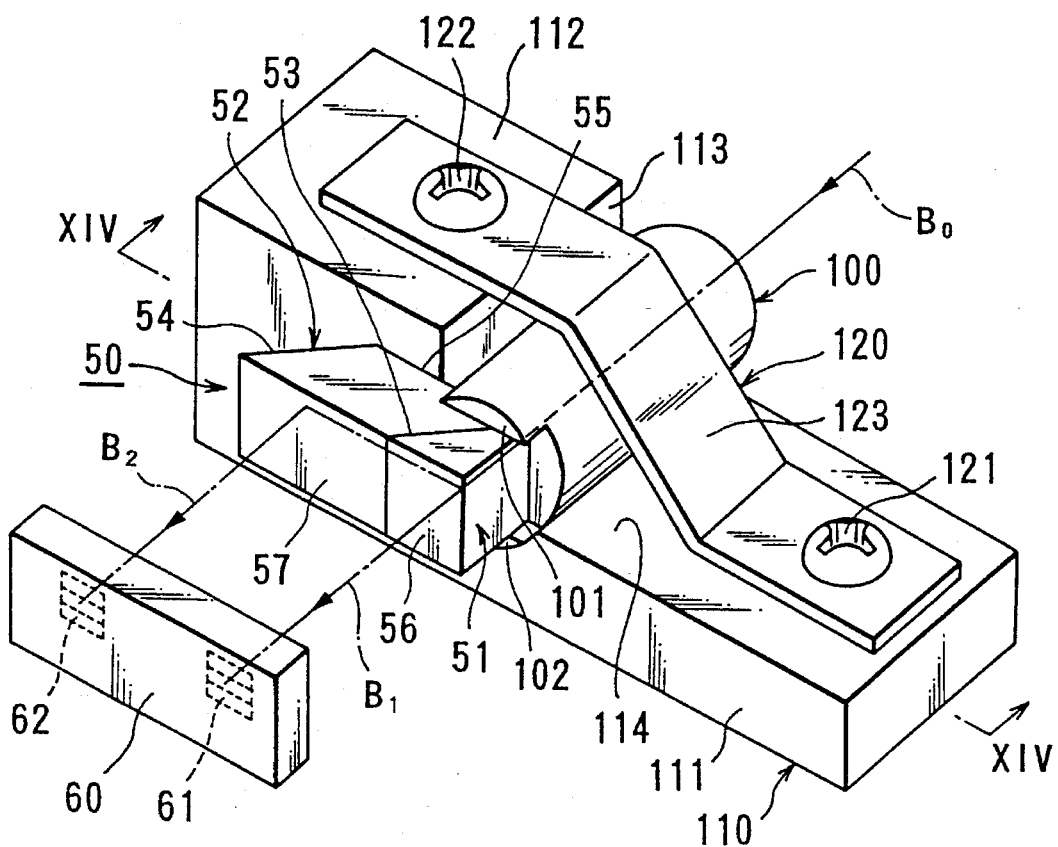
FIG. 13 is a perspective view showing an eighth .embodiment of the present invention.
Figure 14:
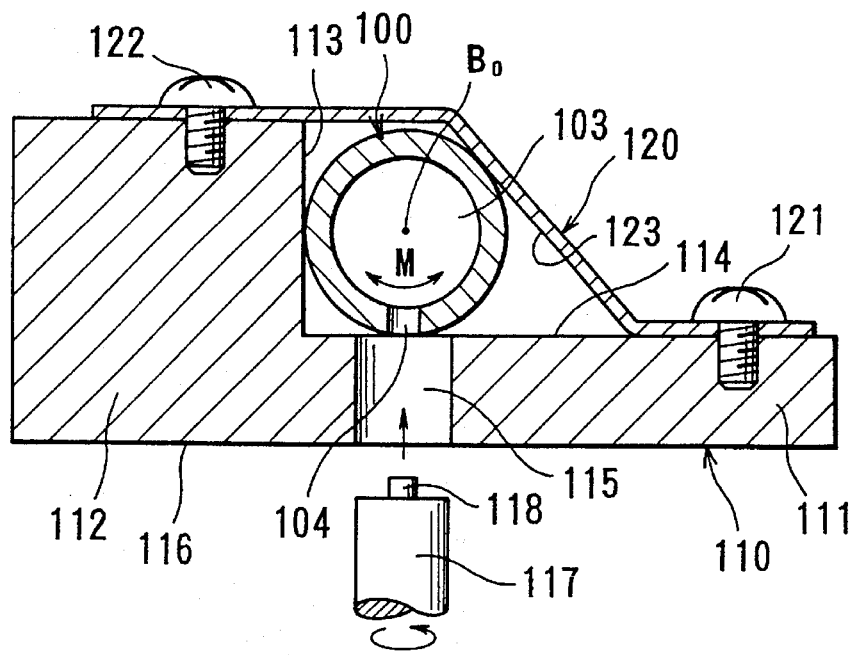
FIG. 14 is a sectional view along line XIV—XIV in FIG. 13 of the present invention.

FIGS. 13 and 14 show an eighth embodiment of the beam receiving position adjusting device.

In this embodiments the beam splitter 50 is fixed to an end portion of a cylindrical member 100, which is supported by a support member 110 to be rotated about the central axis of the cylindrical member 100. The photo sensors 61 and 62 are mounted on the support frame 60 to face the polarizing beam splitter 50.

The support member 110 has a flat portion 111 and a cubic portion 112 which are formed integrally with each other. A side wall 113 of the cubic portion 112 is vertical to an upper surface of the flat portion 111. The cylindrical member 100 is placed on the flat portion 111 in such a manner that the central axis of the cylindrical member 100 is parallel to the side wall 113.

A spring plate 120 is connected to the support member 110. The spring plate 120 is bent approximately in an S-shape. Thus a slant portion 123 is formed in a middle portion of the spring plate 120. One end of the spring plate 120 is fixed to the flat portion by a screw 121. The other end of the spring plate 120 is fixed to the cubic portion 112 by a screw 122, so that an inner surface of the slant portion 12 is pressed on an outer surface of the cylindrical member 100. Therefore, the outer surface of the cylindrical member 100 is supported by the side wall 113, the upper surface 114 of the flat portion 111, and the slant portion 123 of the spring plate 120, and thus the position and movement of the cylindrical member 100 are restrained.

The end portion of the cylindrical member 100 is projected over the side of the flat portion 111, and is provided with a pair of claws 101 and 102 which are extended in a horizontal direction and in parallel to each other. The beam splitter 50 is fit between the claws 101 and 102.

The polarizing beam splitter 50 has the first prism 51 having a right-angled triangular plane face, and the second prism 52 having a parallelogrammical plane face. The first prism 51 and the second prism 52 are joined with each other through the polarized light splitting plane 53. The first prism 51 has the first radiating plane 56, and the second prism 52 has the incident plane 55 and the second radiating plane 57. The first radiating plane 56 and the second radiating plane 57 are parallel to the incident plane 55. The polarized light splitting plane 53 is inclined by about 45 degrees with respect to the incident plane 55. The total reflecting plane 54 is parallel to the polarized light splitting plane 53.

The incident plane 55 is perpendicular to the central axis of the cylindrical member 100, and a part of the incident plane 55 is located in an axial hole 103 formed in the cylindrical member 1DO. The first radiating plane 56 is positioned in front of the end portion of the cylindrical member 100, and the second radiating plane 57 is horizontally adjacent to the first radiating plane 56.

The luminous flux $B_0$ is coincident with the central axis of the cylindrical member 100. The luminous flux $B_0$ passes through the axial hole 103 to enter the first prism 52 through the incident plane 55. Note, the inner diameter of the axial hole 103 has a length such that, even when the incident luminous flux $B_0$ is moved in a radial direction of the axial hole 103 during an adjusting operation of the signal sensing system or an operation of reading a signal recorded on a magneto-optical disc, the incident luminous flux $B_0$ is positioned in the axial hole 103.

In the beam splitter 50, the luminous flux $B_0$ is split into two luminous fluxes by the polarized light splitting plane 53. The luminous flux passing through the polarized light splitting plane 53 is radiated from the first radiating plane 56 as the first luminous flux $B_1$ to enter the first photo sensor 61. The luminous flux reflected by the polarized light splitting plane 53 is reflected by the total reflecting plane 54, and is radiated from the second radiating plane 57 as the second luminous flux $B_2$ to enter the second photo sensor 62. The optical axis of the first luminous flux $B_1$ is coincident with that of the incident luminous flux $B_0$. The optical axis of the second luminous flux $B_2$ is parallel to that of the first luminous flux $B_1$.

As shown in FIG. 14, the flat portion 111 is provided with an opening 115 extending from the upper surface 114 to a lower surface 116 of the flat portion 111. The cylindrical member 100 has a radial hole 104 extending in a radial direction thereof, and the radial hole 104 is positioned close to the opening 115. An adjusting rod 117 is inserted in the opening 115. An offset pin 118, provided on an end surface of the adjusting rod 117, is inserted in the radial hole 104. The offset pin 118 is formed on a portion which is offset from the center of the end surface of the adjusting rod 117.

In an adjusting operation in which the optical axis of the second luminous flux $B_2$ is rotated, so that the beam receiving position on the second photo sensor 62 is adjusted, the adjusting rod 117 and the offset pin 118 are inserted in the opening 115 and the radial hole 104, respectively. Then, the adjusting rod 117 is rotated in either direction, so that the offset pin 118 is rotated. Thus, the cylindrical member 100 is rotated about the central axis thereof against a frictional force generated by the upper surface 114, the side wall 113, and the slant portion 123. Due to this rotation of the cylindrical member 100, the beam splitter 50 is rotated about the central axis of the cylindrical member 100, i.e., the luminous fluxes $B_0$ and $B_1$.

Note, although it is preferable that the beam splitter 50 is rotated about the optical axis of the luminous flux $B_1$ as the embodiment described above, the rotational axis of the beam splitter 50 need not coincide exactly with the optical axis of the luminous flux $B_1$. Namely, the beam splitter 50 maybe rotated about the axis close to the optical axis of the radiating luminous flux $B_1$. In this case, the axis about which the beam splitter 50 is rotated must be determined in such a manner that, when the beam splitter 50 is rotated, the incident luminous flux $B_0$ and the radiating luminous flux $B_1$ are not dislocated from the hole 103 of the cylindrical member 100. Further, it is preferable that the axis is parallel to the radiating luminous flux $B_1$.

The photo sensors 61 and 62 are fixed on a single plane of the support frame 60, or two planes of the support frame 60 which are parallel to each other. The surfaces of the beam receiving areas of the photo sensors 61 and 62 are perpendicular to the luminous fluxes $B_1$ and $B_2$. The distance between the positions where the photo sensors 61 and 62 are mounted, i.e., the distance from the center of the photo sensor 61 to the center of the photo sensor 62, is approximately the same as the distance between the luminous fluxes $B_1$ and $B_2$.

Figure 15:
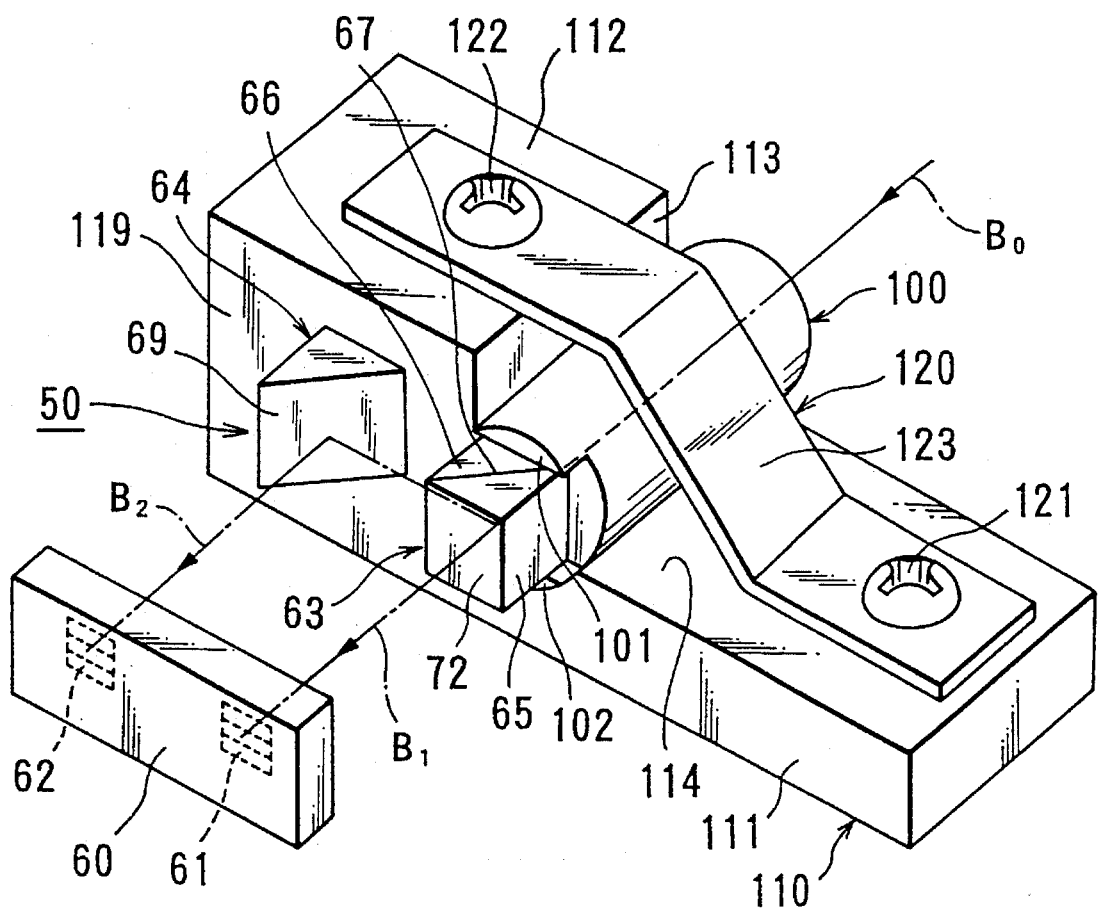
FIG. 15 is a perspective view showing a ninth embodiment of the present invention.

FIG. 15 shows a ninth embodiment of the beam receiving position adjusting device. In the ninth embodiments the beam splitter 50 has a beam splitting unit 63 and a mirror 64. The beam splitting unit 63 includes two right-angle prisms 65 and 66 each having a triangular side face. The right-angle prisms 65 and 66 are joined with each other on a polarized light splitting plane 67. The beam splitting unit 63 is provided on the end portion of the cylindrical member 100, and the mirror 64 is fixed on a side wall 119. The other constructions are the same as in the eighth embodiment.

The mirror 64 is provided on the side wall 119 in such a manner that a reflecting face 69 is parallel to the polarized light splitting plane 67.

The luminous flux $B_0$ enters the prism 66 through an incident plane thereof at a right angle relative to the incident plane. The incident luminous flux $B_0$ is split into an S-polarized component and P-polarized component by the polarized light splitting plane 67. The P-polarized component passes through the polarized light splitting plane 67 and the prism 65, to be radiated from a first radiating plane 72 as the first luminous flux $B_1$. The S-polarized component is reflected by the polarized light splitting plane 67, and is radiated from the prism 66. The S-polarized component is reflected by a total reflecting plane 69 of the prism 64, and is radiated from the prism 69 as the second luminous flux $B_2$. The optical axis of the incident luminous flux $B_0$ is coincident with that of the first luminous flux $B_1$. The axis of the second luminous flux $B_2$ is parallel to that of the first luminous flux $B_1$.

Figure 16:
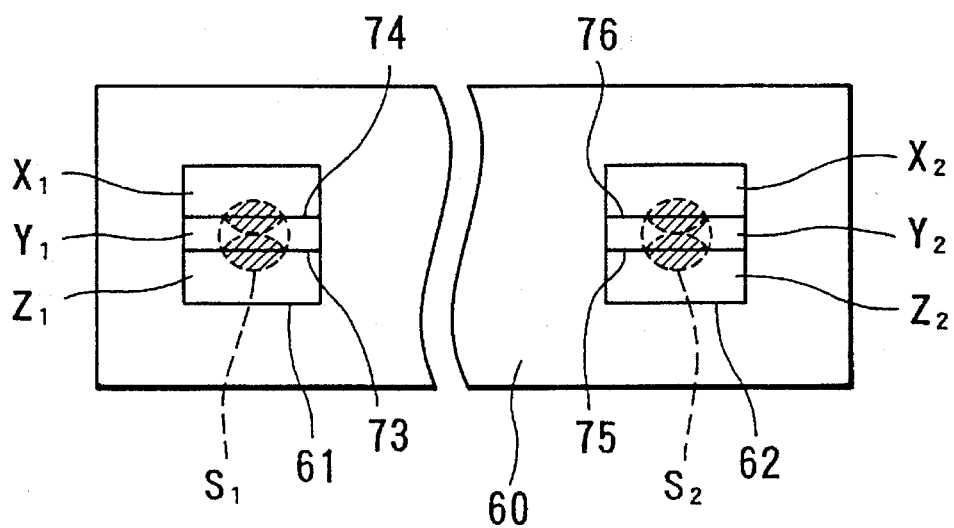
FIG. 16 is a view showing photo sensors.

FIG. 16 shows the photo sensors 61 and 62 provided in the eighth and ninth embodiments. The construction of these photo sensors 61 and 62 is similar to that shown in FIG. 8, and the only difference from. FIG. 8 is that the photo sensors 61 and 62 are disposed along a horizontal line in FIG. 16 to conform with the arrangement of the beam splitter 50. The other constructions and operations are the same as those shown in FIG. 8.

Figure 17:
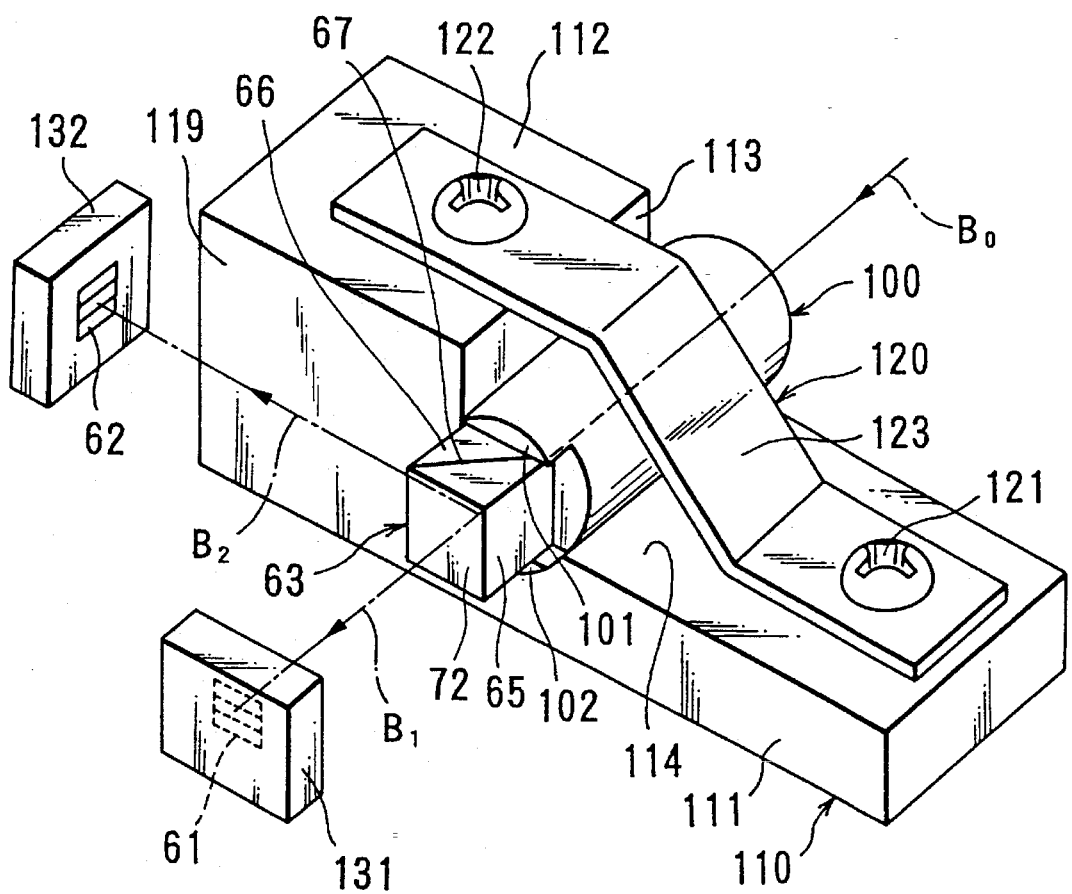
FIG. 17 is a perspective view showing a tenth embodiment of the present invention.

FIG. 17 shows a tenth embodiment of the beam receiving position adjusting device in this embodiment, a mirror is not provided on the side wall 119, and the photo sensors 61 and 62 are mounted on separate plates 131 and 132, respectively. The plates 131 and 132 are disposed to form a right angle with each other. The other constructions are the same as the ninth embodiment shown in FIG. 15.

The luminous flux $B_0$ enters the prism 66 through an incident plane thereof at a right angle relative to the incident plane. The incident luminous flux $B_0$ is split into an S-polarized component and P-polarized component by the polarized light splitting plane 67. The P-polarized component passes through the polarized light splitting plane 67 and the prism 65, to be radiated from a first radiating plane 72 as the first luminous flux B,. The S-polarized component is reflected by the polarized light splitting plane 67, and is radiated from the prism 66 as the second luminous flux $B_2$. The optical axis of the incident luminous flux $B_0$ is coincident with that of the first luminous flux $B_1$, and the axis of the second luminous flux $B_2$ is perpendicular to that of the first luminous flux $B_1$.

Note, the plates 131 and 132 may be formed as one body. Further, the angle formed by the plates 131 and 132 is not rectricted to a right angle as shown in FIG. 17, but may be 45 degrees through 135 degrees.

As described above, in the beam receiving position adjusting devices shown in FIGS. 13 through 17, the beam receiving positions of the photo sensors 61 and 62 are adjusted by an operation in which the polarizing beam splitter 50 is rotated about the optical axis of the luminous flux $B_1$, for example, relative to the photo sensors 61 and 62. Namely, the beam splitter 50 is rotated clockwise or counterclockwise by rotating the cylindrical member 100 about the central axis thereof. In another embodiment, the photo sensors 61 and 62 may be rotated about the optical axis of the luminous flux $B_1$, relative to the beam splitter 50, or the photo sensors 61 and 62 and the beam splitter 50 may be rotated.

When the beam splitter 50 is rotated in the direction shown by the arrow M as shown in FIG. 14, in the photo sensor 61 onto which the luminous flux $B_1$ is radiated, the position on which the beam spot S1 is formed is not substantially changed. Conversely, in the other photo sensor 62, the position on which the beam spot S2 is formed is moved in a direction perpendicular to the boundary lines 75 and 76.

Accordingly, in the adjusting operation, first, the support frames 60 and 131 are positioned at a predetermined position in such a manner that the photo sensor 61, in which the beam spot S1 is not moved, is set to a proper position, namely, in such a manner that the center of the beam spot S1 coincides with the center of the beam receiving face of the photo sensor 61. Then, the polarizing beam splitter 50 is rotated in the direction of the arrow M by a predetermined amount so that the center of the beam spot S2 coincides with the center of the beam receiving face of the photo sensor 62. Thus, the luminous fluxes $B_1$ and $B_2$ are adjusted to be radiated onto proper portions on the photo sensors 61 and 62.

Note, in each of the eighth and ninth embodiments, the maximum value of the rotational angle of the beam splitter 50 is determined based on the distance between the rotational axis of the beam splitter 50 and the radiating luminous flux $B_2$. The maximum value by which the beam receiving position is adjusted on the photo sensor 62. For example, when the distance between the rotational axis and the radiating luminous flux $B_2$ is 6 mm, and the amount of adjustment of the beam receiving face of the photo sensor 62 is ±0.2 mm, the rotational angle is about ±0.2°.

Due to the rotation of the beam splitter 50, the angle of the polarized light splitting plane 53, relative to the polarizing direction of the incident luminous flux $B_0$, is changed. Thus the light intensity of the P-polarized component and the light intensity of the S-polarized component become unbalanced. However, if the rotational angle of the beam splitter 50 is very small, such as within ±0.1°, the unbalanced value is negligible. Conversely, if the rotational angle of the beam splitter 50 is as large as about ±5°, as shown in FIG. 12, the λ/2 plate 39 is rotated about the optical axis of the luminous flux $B_0$ (i.e., in the direction of the arrow T) by a rotating mechanism (not shown), so that the polarizing direction is adjusted, whereby the unbalance of the polarized components is removed.

As described above, in the beam receiving position adjusting devices shown in FIGS. 13 through 17, by only an operation in which the polarizing beam splitter 50 is rotated, the beam receiving positions of the photo sensors 61 and 62 are adjusted. Namely, this operation is very easy, and the positional adjustment can be attained with a high degree of accuracy.

Note, the construction of the rotating mechanism by which the beam splitter 50 is rotated is not restricted to those shown in FIGS. 13 through 17. Namely, this rotating mechanism may be constructed such that the rotation of a handle is transmitted through a reduction gear train to a support member to which the beam splitter is supported, and thus the beam splitter may be rotated.

As shown in FIGS. 8 and 16, in a case in which the boundary lines 73 through 76 of the photo sensors 61 and 62 are extended in only one direction, even if the beam spots S1 and S2, on the photo sensors 61 and 62, are moved in a direction parallel to the boundary lines 73 through 76, a signal read from the magneto-optical disc 20, the focusing error signal and the tracking error signal are not changed. Therefore, the positional adjustment of the beam spots S1 and S2, in the direction parallel to the boundary lines 73 through 76, does not need to be carried out with a high accuracy.

Further note, a condenser lens, a cylindrical lens, an optical filter, a mirror and the like may be provided between a first optical component such as the polarizing beam splitter 50 and a second optical component such as the photo sensors 61 and 62.

Note, the present invention can be applied not only to a magneto-optical disc device as shown in the drawings, but also to an optical disc device of a write-once-type in which only one recording operation is possible on each track. Tn this cases the polarizing beam splitter 50 may be just a beam splitter.

The present invention can also be applied to a signal sensing system of an optical disc device which is used only for reproducing a compact disk or a laser disc. Further, the present invention can also be applied to other kinds of optical devices or optical measuring devices, to adjust a beam receiving position on a photo sensor when a plurality of (especially, 2) luminous fluxes are radiated onto a plurality of (especially, 2) beam receiving portions.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application HEI No. 4-129312 (filed on Apr. 20, 1992) and No. HEI-4-130026 (filed on Apr. 23, 1992) which are expressly incorporated herein by reference in their entirety.

We claim:

1. A device for adjusting a position of a beam receiving portion of a photo sensor, comprising:

means for generating a first luminous flux and a second luminous flux from an incident luminous flux entering said generating means, said first luminous flux being spaced from said second luminous flux;

means for receiving said first luminous flux and said second luminous flux, said receiving means having a first beam receiving portion onto which said first luminous flux is radiated, and a second beam receiving portion onto which said second luminous flux is radiated, the position of said first beam receiving portion being spaced from the position of said second beam receiving portion;

means for moving said generating means to change the spacing between said first beam receiving portion and said second beam receiving portion;

said generating means comprising means for generating said first luminous flux and said second luminous flux so that they are inclined by a predetermined angle relative to each other; and said moving means moving said generating means along a direction of one of said first luminous flux and said second luminous flux.

2. A device according to claim 1, wherein said predetermined angle has a value from 1 degree to 10 degrees.

3. A device according to claim 1, wherein said generating means has a beam splitter which receives one incident luminous flux and divides said incident luminous flux to radiate said first luminous flux and said second luminous flux.

4. A device according to claim 3, wherein said beam splitter comprises an incident plane which said incident luminous flux enters, a splitting plane by which said incident luminous flux is split into said first luminous flux and said second luminous flux, a total reflecting plane which reflects said second luminous flux, a first radiating plane from which said first luminous flux is radiated, and a second radiating plane from which said second luminous flux is radiated.

5. A device according to claim 4, wherein said total reflecting plane is not parallel to sa;id splitting plane, and said first and said second radiating planes are parallel to said incident plane.

6. A device according to claim 4, wherein said total reflecting plane is parallel to said splitting plane, said first radiating plane is parallel to said incident plane, and said second radiating plane is not parallel to said incident plane.

7. A device according to claim 4, wherein said total reflecting plane is parallel to said splitting plane, said first radiating plane is not parallel to said incident plane, and said second radiating plane is parallel to said incident plane.

8. A device according to claim 3, wherein said beam splitter comprises an incident plane which said incident luminous flux enters, a splitting plane by which said incident luminous flux is split into said first luminous flux and said second luminous flux, a total reflecting plane which reflects said second luminous flux, and a radiating plane from which said first luminous flux is radiated, and said total reflecting plane is not parallel to said splitting plane.

9. A device for adjusting a position of a beam receiving portion of a photo sensor, comprising:

means for generating a first luminous flux and a second luminous flux from an incident luminous flux entering said generating means, said first luminous flux being spaced from said second luminous flux;

means for receiving said first luminous flux and said second luminous flux, said receiving means having a first beam receiving portion onto which said first luminous flux is radiated, and a second beam receiving portion onto which said second luminous flux is radiated, the position of said first beam receiving portion being spaced from the position of said second beam receiving portion; and means for moving said generating means to change the spacing between said first beam receiving portion and said second beam receiving portion;

wherein the optical axis of said incident luminous flux is parallel to a line along which said generating means is moved.

10. A device for adjusting a position of a beam receiving portion of a photo sensor, comprising:

means for generating a first luminous flux and a second luminous flux from an incident luminous flux entering said generating means, said first luminous flux being spaced from said second luminous flux;

means for receiving said first luminous flux and said second luminous flux, said receiving means having a first beam receiving portion onto which said first luminous flux is radiated, and a second beam receiving portion onto which said second luminous flux is radiated, the position of said first beam receiving portion being spaced from the position of said second beam receiving portion;

means for moving said generating means to change the spacing between said first beam receiving portion and said second beam receiving portion; and said generating means having a beam splitter which receives one incident luminous flux and divides said incident luminous flux to radiate said first luminous flux and said second luminous flux;

wherein said moving means has a support plate on which said beam splitter is provided, said support plate being provided with a slot along which said support plate can be moved, and a screw disposed in said slot to secure said support plate to a predetermined position.

11. A device for adjusting a position of a beam receiving portion of a photo sensor, comprising:

an optical member for receiving at least one incident luminous flux to generate a first luminous flux and a second luminous flux which are substantially parallel to and spaced from each other;

a first photo sensor having a first beam receiving portion onto which said first luminous flux is radiated; and a second photo sensor having a second beam receiving portion onto which said second luminous flux is radiated, said first beam receiving portion being spaced from said second beam receiving portion;

said optical member being moved along an optical axis of one of said first and said second luminous fluxes, whereby the spacing between said first beam receiving portion and said second beam receiving portion is adjusted.

12. A device for adjusting a position of a beam receiving portion of a photo sensor, comprising:

means for generating a first luminous flux and a second luminous flux from a luminous flux entering said generating means;

means for receiving said first luminous flux and said second luminous flux, said receiving means having a first beam receiving portion onto which said first luminous flux is radiated, and a second beam receiving portion onto which said second luminous flux is radiated, a position of said first portion being spaced from a position of said second portion;

means for moving at least one of said generating means and said receiving means to change a position of one of said first and said second beam receiving portions while leaving a position of the other of said first and said second beam receiving portions unchanged;

one of said first luminous flux and said second luminous flux being inclined by a predetermined angle, relative to the other of said first luminous flux and said second luminous flux; and wherein said moving means moves said at least one of said generating means and said receiving means along a direction of one of said first luminous flux and said second luminous flux.

13. A device for adjusting a position of a beam receiving portion of a photo sensor, comprising:

means for generating a first luminous flux and a second luminous flux from a luminous flux entering said generating means;

means for receiving said first luminous flux and said second luminous flux, said receiving means having a first beam receiving portion onto which said first luminous flux is radiated, and a second beam receiving portion onto which said second luminous flux is radiated, a position of said first portion being spaced from a position of said second portion;

said generating means comprising means for generating said first luminous flux and said second luminous flux so that they are inclined by a predetermined angle relative to each other; and means for moving at least one of said generating means and said receiving means to change a position of one of said first and said second beam receiving portions while leaving a position of the other of said first and said second beam receiving portions unchanged;

wherein the first and second beam receiving portions are divided by at least one boundary line, said at least one boundary line being perpendicular to a line along which said position of the one of said first and said second beam receiving portions is changed by said moving means.

14. A device according to claim 13, said moving means moving said generating means along a direction of one of said first luminous flux and said second luminous flux.

15. A device for adjusting a position of a beam receiving portion of a photo sensor, comprising:

means for generating a first luminous flux and a second luminous flux from a luminous flux entering said generating means;

means for receiving said first luminous flux and said second luminous flux, said receiving means having a first beam receiving portion onto which said first luminous flux is radiated, and a second beam receiving portion onto which said second luminous flux is radiated, a position of said first portion being spaced from a position of said second portion;

means for moving at least one of said generating means and said receiving means to change a position of one of said first and said second beam receiving portions while leaving a position of the other of said first and said second beam receiving portions unchanged;

wherein said generating means including a beam splitter which receives one incident luminous flux and divides said incident luminous flux to radiate said first luminous flux and said second luminous flux;

said generating means further including means for generating said first luminous flux and said second luminous flux so that they are inclined by a predetermined angle relative to each other; and said beam splitter including an incident plane which said incident luminous flux enters, a splitting plane by which said incident luminous flux is split into said first luminous flux and said second luminous flux, a total reflecting plane which reflects said second luminous flux, a first radiating plane from which said first luminous flux is radiated, and a second radiating plane from which said second luminous flux is radiated;

wherein said total reflecting plane is not parallel to said splitting plane, and said first and said second radiating planes are parallel to said incident plane.

16. A device according to claim 15, said moving means moving said generating means along a direction of one of said first luminous flux and said second luminous flux.

17. A device for adjusting a position of a beam receiving portion of a photo sensor, comprising:

means for generating a first luminous flux and a second luminous flux from a luminous flux entering said generating means;

means for receiving said first luminous flux and said second luminous flux, said receiving means having a first beam receiving portion onto which said first luminous flux is radiated, and a second beam receiving potion onto which said second luminous flux is radiated, a position of said first portion being spaced from a position of said second portion;

means for moving at least one of said generating means and said receiving means to change a position of one of said first and said second beam receiving portions while leaving a position of the other of said first and said second beam receiving portions unchanged;

said generating means including a beam splitter which receives one incident luminous flux and divides said incident luminous flux to radiate said first luminous flux and said second luminous flux; and wherein said moving means includes a support plate on which said beam splitter is provided, said support plate being provided with a slot along which said support plate can be moved, and a screw disposed in said slot to secure said support plate to a predetermined position.

18. A device according to claim 17, said moving means moving said generating means along a direction of one of said first luminous flux and said second luminous flux.

* * * * *

UNITED STATES PATENT AND TRADEMARK OFFICE
CERTIFICATE OF CORRECTION

PATENT NO. : 5,559,639
DATED : September 24, 1996
INVENTOR(S) : T. NAKAGISHI et al.

It is certified that error appears in the above-indentified patent and that said Letters Patent is hereby corrected as shown below:

At column 17, line 32, change "sa;d" to --said--.

Signed and Sealed this

Twenty-fifth Day of March, 1997

Attest:

BRUCE LEHMAN

Attesting Officer

Commissioner of Patents and Trademarks